May 12, 1936.  K. J. DE JUHASZ  2,040,082
ENGINE PRESSURE INDICATOR
Filed July 10, 1933
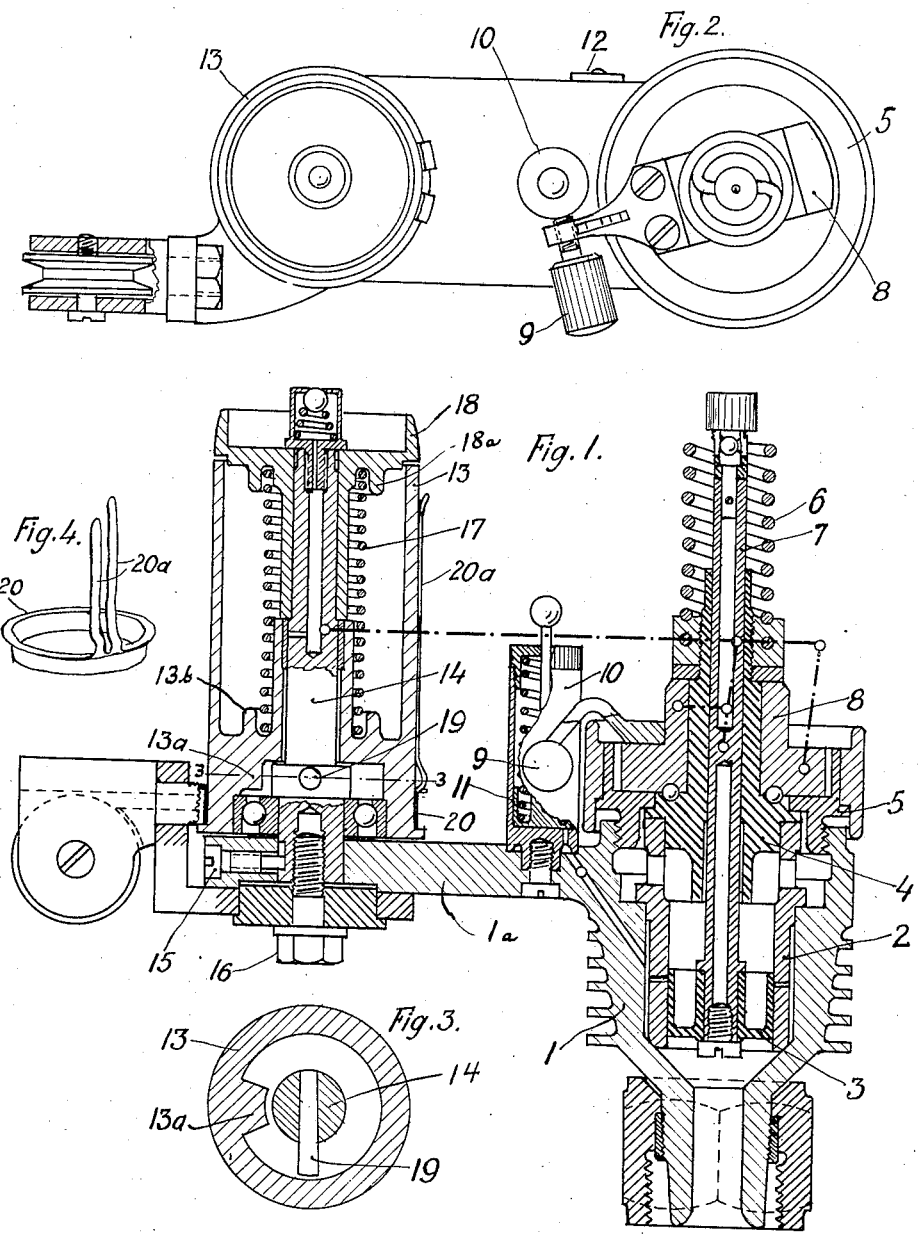
Inventor
Kalman John De Juhasz Patented May 12, 1936

2,040,082

UNITED STATES PATENT OFFICE 2,040,082

ENGINE PRESSURE INDICATOR

Kalman John De Juhasz, State College, Pa.

Application July 10, 1933, Serial No. 679,659

3 Claims. (Cl. 234—23)

The invention relates to improvements in pressure indicators in which a spring-loaded piston is displaced by fluid pressure and such displacements are magnified by a lever mechanism and recorded by a stylus point on a card fastened onto an oscillating drum. The objects of the improvements are, first, to facilitate the setting of the drum for right-handed or left-handed operation at will; second, to make the drum lighter in weight, less liable to being dented and less expensive to build; third, to provide continuous lubrication for the indicator piston; and, fourth, to dissipate heat from the indicator, thereby facilitating its handling on high temperature engines and improving its accuracy.

One form of the invention is illustrated in the accompanying drawing, in which Figure 1 is a vertical section through the indicator; Figure 2 a top view; Figure 3 a cross section of the drum on the line 3—3 showing the arrangement of the stop for the limitation of oscillation; and Fig. 4 a view of the paper clip.

In the indicator cylinder formed in the body 1, the interchangeable bushing 2, the closely fitting piston 3 and cylinder head 4 are secured by means of ring nut 5. The indicator spring 6 is fastened at its base to the cylinder head 4 and at its top to the piston rod 7. The piston rod 7 actuates the magnifying lever system of the usual type, shown schematically in dash-dot lines, which is built onto the turn-table 8 which latter may be rocked by means of handle 9 and thereby the recording stylus attached to the end of the magnifying lever may be brought into contact with the card placed on the indicator drum. The stylus pressure can be regulated by screwing in or out the handle 9 the end of which bears against the stop-post 10. This latter is formed as a hollow cylinder serving as a receptacle for lubricant which is subjected to pressure by the spring-loaded piston 11 movable therein. Through drilled passages in the indicator body 1, lubricant under pressure is fed constantly to the annular space between bushing 2 and the indicator body whence it passes through suitable holes to the side surface of the piston 3. The lubricant supply can be replenished through the nipple 12 by means of a grease-gun or other suitable means. The protruding rod of piston 11 serves as a telltale showing whether the lubricant supply is sufficient or exhausted.

The indicator body is fitted with cooling fins arranged circumferentially (as shown) or longitudinally (not shown). I am aware that cooling fins are extensively used in other devices, such as engines, but their use in indicators is novel.

The drum 13 is mounted on preferably antifriction bearing upon the axle 14 which in turn is secured into the extending indicator arm 1a of body 1 by means of locating screw 15 and fastening screw 16. The locating screw 15 engages with one of two slots machined into axle 14, one serving for right-handed, the other for left-handed set up of the recording mechanism. The drum is actuated by a cord in the usual manner against the force of the drum spring 17, one end of which latter engages with the drum and the other end with the stationary drum cap 18. Co-axiality of the drum spring 17 with the drum 13 is secured by two circular ridges, one, 13b in the drum body, and the other 18a in the drum cap which said circular ridges loosely surround the two ends of the spring. In the circular ridges 13b and 18a notches are formed with which notches engage the two ends of the spring wire which are suitably bent for this purpose, thereby anchoring the spring to the drum and the drum cap respectively. The drum cap 18 is prevented from rotation by the splines on the upper end of the drum axle 14 with which it engages. The tension of the drum spring may be adjusted by unscrewing the lubricator nipple on the upper end of the drum axle, lifting the drum cap 18 out of engagement with the splined axle end, turning it to the desired tension and then bringing it again into engagement with the splines.

On the inner side of the drum, a nose 13a is provided which coacts with the radial stop pin 19 fitted into the drum axle. This limits the possible motion of the drum.

In previously known indicators, the limiting stop was arranged in the indicator arm necessitating the dismantling of the drum spring whenever it was desired to change the drum from right-handed operation to left-handed operation or vice versa. In my invention, however, the drum assembly as a whole can be lifted out from the arm and reset, without disturbing the drum spring setting. My drum construction lends itself to manufacture from plastic compound, such as molded "bakelite" resulting in lower cost of production, less liability to being dented and lighter weight compared with the thin-walled metallic (brass or steel) drums hitherto used.

On the bottom end of the drum a flanged metal band 20 is arranged serving as a pulley for the cord. Preferably, the paper clip fingers 20a holding the card should be integral with this flanged band.

I claim:

1. In a pressure indicator of the character described, a drum assembly incorporating an axle with an inserted stop pin and a drum body having a nose on its inside coacting with said stop pin.

2. In a pressure indicator of the type described having a turntable, an indicator arm, an indicator cylinder and a drum, a hollow cylinder fastened to the indicator arm between the indicator cylinder and the drum, said hollow cylinder having the dual function as a container for lubricant and as a stop-post limiting the rocking motion of the turntable.

3. A pressure indicator of the character described comprising a drum spring, a drum body formed with a bottom portion and a ridge protruding upward from said bottom portion, said ridge serving for guiding one end of the spring.

KALMAN JOHN DE JUHASZ.